(No Model.) 2 Sheets—Sheet 1.
R. LUNDELL.
DYNAMO ELECTRIC MACHINE.
No. 490,449. Patented Jan. 24, 1893.
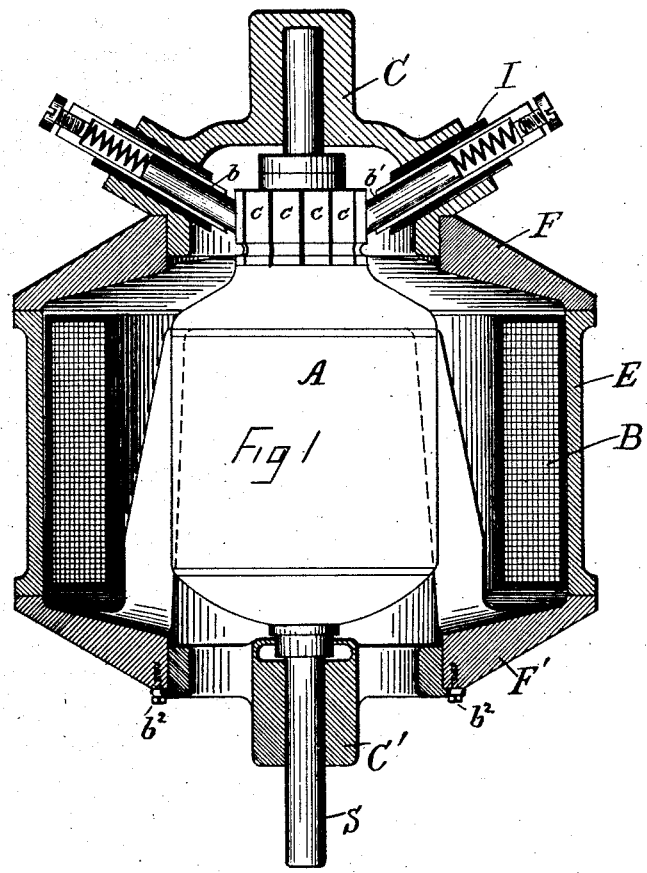
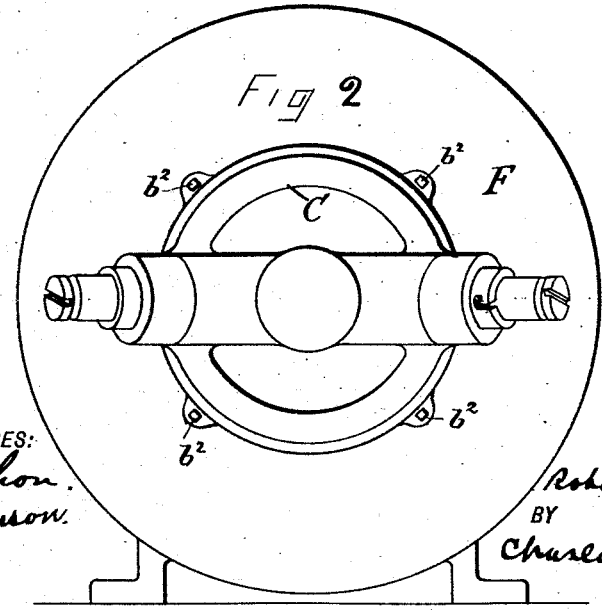
WITNESSES:
H. McMahon.
M. M. Robinson.
INVENTOR
Robert Lundell
BY
Charles J. Kintner
ATTORNEY.

(No Model.) 2 Sheets—Sheet 2.
R. LUNDELL.
DYNAMO ELECTRIC MACHINE.
No. 490,449. Patented Jan. 24, 1893.
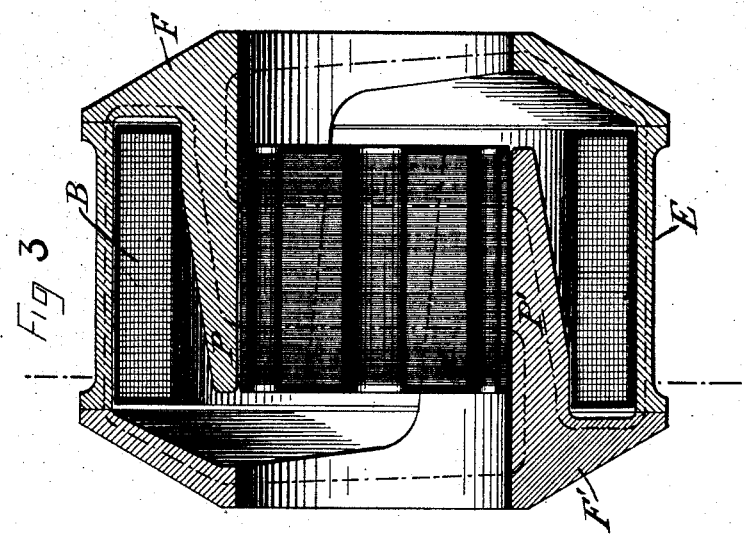
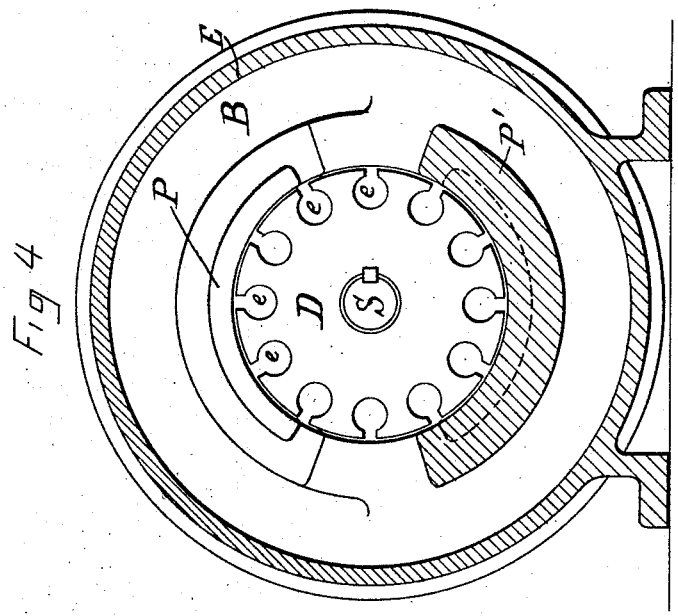
WITNESSES:
INVENTOR
Robert Lundell
BY
Charles J. Kintner
ATTORNEY.

UNITED STATES PATENT OFFICE.

ROBERT LUNDELL, OF BROOKLYN, ASSIGNOR OF TWO-THIRDS TO EDWARD H. JOHNSON, OF NEW YORK, N. Y.

DYNAMO-ELECTRIC MACHINE.

SPECIFICATION forming part of Letters Patent No. 490,449, dated January 24, 1893.

Application filed June 21, 1892. Serial No. 437,446. (No model.)

*To all whom it may concern:*

Be it known that I, ROBERT LUNDELL, a citizen of the United States of America, residing at Brooklyn, in the county of Kings, State of New York, have invented certain new and useful Improvements in Electric Motors or Dynamo-Electric Machines, of which the following is a specification.

My invention is directed particularly to improvements upon an electric motor disclosed in a prior patent granted to me on the 30th day of August, 1892, and numbered 481,701. The motor described in the aforesaid patent was of a spherical type, that is to say, the structure was such that the field magnet cores were integral with a spherical inclosing shell and all of the operative parts of the motor were inclosed within said shell.

The present invention is directed to improvements looking to the adoption of many of the features disclosed in the aforesaid patent in connection with a cylindrical form of inclosing shell, and its objects are, First. To so construct a motor of the type named that a single energizing field magnet coil may be utilized and inclosed within a cylindrical shell or case which protects all of the operative parts of the machine, and surrounds the armature. Second. To so arrange the parts of such a motor that the armature may be removed for repairs and the like, without disturbing the field magnet coil and its retaining casing. Third. To accomplish such results as are naturally attributable to the entire structure as hereinafter described, the especial points of novelty which I deem of value being particularly pointed out in the claims at the end of the following specification.

In order that my invention may be fully understood reference is had to the accompanying drawings in all of which like letters of reference represent like parts wherever used.

Figure 1 is a longitudinal sectional view taken through the body of my improved machine illustrating the armature, its shaft, commutator, and commutator brushes in elevation. Fig. 2 is an end view thereof as seen looking at Fig. 1 from the top toward the bottom of the drawing. Fig. 3 is a longitudinal sectional view taken through the body of the machine on a plane at right angles to the sectional view shown in Fig. 1, the axis of the armature, the commutator, commutator brushes and the journal bearings being removed. Fig. 4 is a transverse sectional view taken through Fig. 3 on line $x$—$x$ and as seen looking from left to right, the shaft of the armature being shown in position.

F and F′ represent the field magnet cores made preferably of cast metal and having inwardly projecting pole pieces P P′, the internal contour of which is cylindrical, while their external contour is beveled or tapering as shown, so that the points of the pole pieces are much thinner than are their bases, their general structure being not unlike the same parts described in my prior patent. The outer ends of the field poles F and F′ constitute the heads or ends of a cylinder or drum E which surrounds or incases the single field magnet coil B, the latter having been slipped in place over the two inwardly projecting pole pieces P P′ and its central axis being coincident with the shaft S of the armature and the heads secured to the drum E by bolts or in any preferred manner, or if preferred the part E might be cast in two parts integral with the parts F and F′. The armature A is provided with a shaft S and is preferably of the Wenstrohm type having laminated disks D (see Fig. 4) with notches or grooves $e$ into which are wound the coils or bobbins, the ends of which are joined to the commutator strips $c\ c$ (see Fig. 1) in the usual manner. The armature shaft S is supported by journal bearings C C′ having bolts $b^2\ b^2$ which secure them to the outer ends o. the field magnet cores F and F′. The bearing C is provided with openings for securing the insulating sleeves I in which are fixed the sliding commutator brushes $b\ b$ provided with retaining sleeves, compression springs and binding screws as shown, these parts being substantially like the same parts disclosed in my prior patent. The journal bearings C and C′ it will be observed are of slightly greater diameter than the armature A so as to admit of its removal when either one of them is detached as will be apparent on inspection of Fig. 1. It will also be noticed that ventilating openings are used in the bearing C' for ventilating the interior of the machine.

The operation of the structure is apparent from the above description and the accompanying drawings.

I believe it is broadly new with me to construct an electric motor or dynamo electric machine with a single field magnet coil which surrounds internal field magnet poles embracing an armature, the axis of which is parallel or coincident with the axis of the field magnet coil so that the windings of the field magnet coil are in planes parallel with the direction of the armature's rotation, and the field magnet pole pieces being included in the annular space between the field magnet and armature coils.

Having thus described my invention what I claim and desire to secure by Letters-Patent of the United States is:—

1. An electric motor or dynamo electric machine having a single field magnet coil which incloses or surrounds inwardly projecting field magnet poles in combination with a rotary armature having its axis coincident or parallel with the axis of the field magnet coil said poles being located in the annular space between the field magnet coil and the armature substantially as described.

2. An electric motor or dynamo electric machine having a cylindrical inclosing shell with inwardly projecting pole pieces and a single field magnet coil in combination with a rotary armature having its axis coincident or parallel with the axis of the field magnet coil the inwardly projecting pole pieces lying in the annular space between said coil and the armature substantially as described.

3. An electric motor or dynamo electric machine having a single field magnet coil and a rotary armature surrounded thereby the effective field magnet poles being included in the annular space between the field magnet coil and the armature and the journal bearings of the armature shaft being secured to the ends of the field magnet core so as to inclose all the operative parts of the machine substantially as described.

4. An electric motor or dynamo electric machine having a hollow cylindrical field magnet core inclosing the field magnet coil and armature, the latter being sustained by a shaft in journal bearings secured to the heads of the cylindrical core and the effective field magnet poles being included in the annular space between the field magnet coil and the armature substantially as described.

5. An electric motor having a single field magnet coil and an armature, the axis of which is co-incident with the axis of the field magnet coil and one or more inwardly projecting field magnet poles located in the annular space between the field magnet coil and the armature, substantially as described.

6. An electric motor or dynamo electric machine having a hollow cylindrical shaped field magnet core provided with inwardly projecting field magnet poles located in the annular space between the field magnet coil and the armature, said field magnet coil and armature being incased by a cylindrical shell or drum and the armature sustained by a shaft located in journal bearings detachably secured to the heads of the shell or drum.

ROBERT LUNDELL.

Witnesses:
C. J. KINTNER,
M. M. ROBINSON.